United States Patent [19]

Fujii et al.

[11] 4,386,994
[45] Jun. 7, 1983

[54] CONVEYOR CONTROL APPARATUS IN A FULLY AUTOMATIC LABELING SYSTEM

[75] Inventors: Kunihiko Fujii, Mishima; Koichi Haraga, Sumiyoshi; Yukihiro Hirosaki; Koichiro Sato, both of Mishima, all of Japan

[73] Assignee: Tokyo Electric Co., Ltd., Tokyo, Japan

[21] Appl. No.: 117,613

[22] Filed: Feb. 1, 1980

[30] Foreign Application Priority Data

Feb. 28, 1979 [JP] Japan .............................. 54-23932
Feb. 28, 1979 [JP] Japan .............................. 54-23933
Feb. 28, 1979 [JP] Japan .............................. 54-23934

[51] Int. Cl.³ .......................................... G05G 15/00
[52] U.S. Cl. ................................ 156/360; 156/384; 364/466; 364/478

[58] Field of Search ...................... 364/567, 466, 478; 53/502; 156/384, 360

Primary Examiner—David A. Simmons
Attorney, Agent, or Firm—Oblon, Fisher, Spivak, McClelland & Maier

[57] ABSTRACT

A fully automatic labeling system having a sending-in conveyor, a weighing conveyor and a sticking conveyor which have their operations controlled independently of one another. This invention controls the operations of the conveyors so that the conveyors may be driven in only necessary states and that weighing and label sticking may be reliably and most efficiently performed even during transfer of a commodity between the conveyors. In both a print fixing operation and a two-stage print mode for a label, transportation intervals of the commodities can automatically have necessary time differences.

8 Claims, 19 Drawing Figures

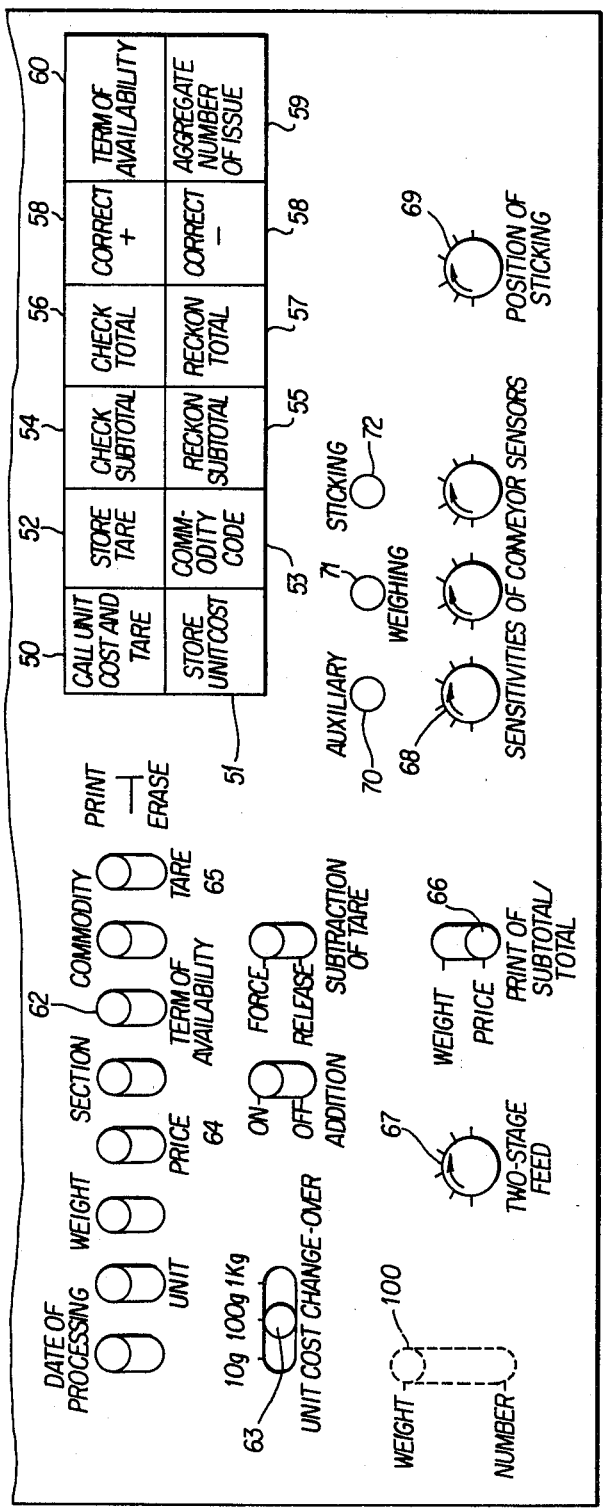
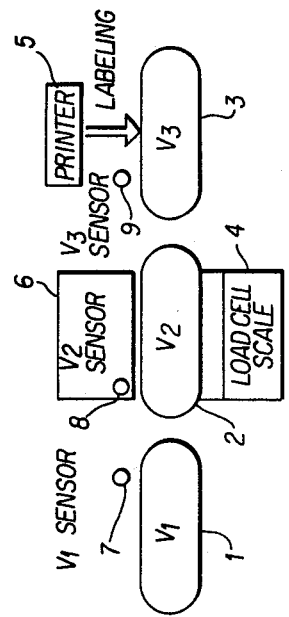
FIG. 2(B)
FIG. 1

```
┌─────────────────────────────────────────────┐
│            NAME OF ARTICLE                  │
│  ┌───────────────────────────────────────┐  │
│  └───────────────────────────────────────┘  │
│                                             │
│ DATE OF PROCESSING  UNIT COST  WEIGHT  PRICE  SECTION CODE │
│   54    1    31       100       200    200      (12)      │
└─────────────────────────────────────────────┘ — 89
```

FIG. 6

```
┌─────────────────────────────────────────────┐
│            NAME OF ARTICLE                  │
│  ┌───────────────────────────────────────┐  │
│  └───────────────────────────────────────┘  │
│ TERM OF AVAILABILITY   TARE   COMMODITY CODE │
│   54    1    31         10       150         │
│ DATE OF PROCESSING  UNIT COST  WEIGHT  PRICE  SECTION CODE │
│   54    1    31       100       200    200      (12)      │
└─────────────────────────────────────────────┘ — 90
```

FIG. 8

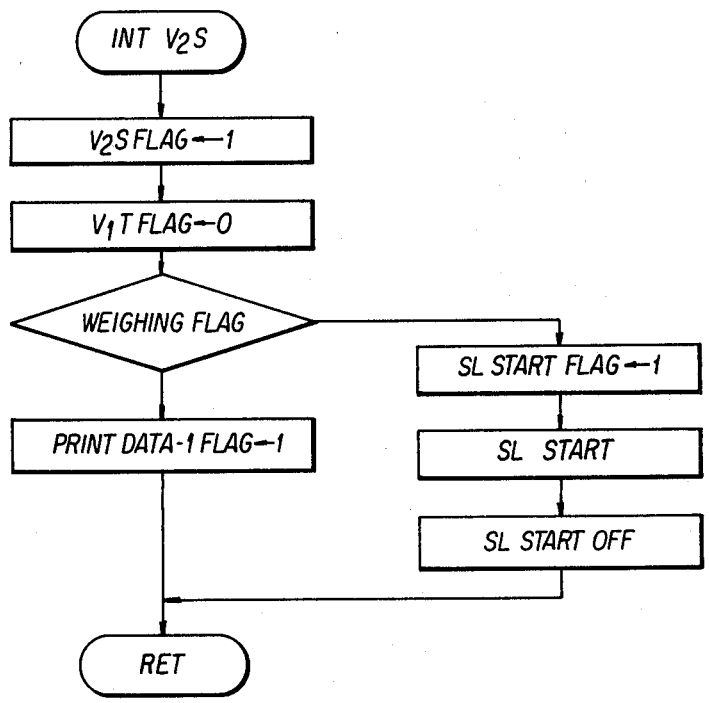

FIG. 11

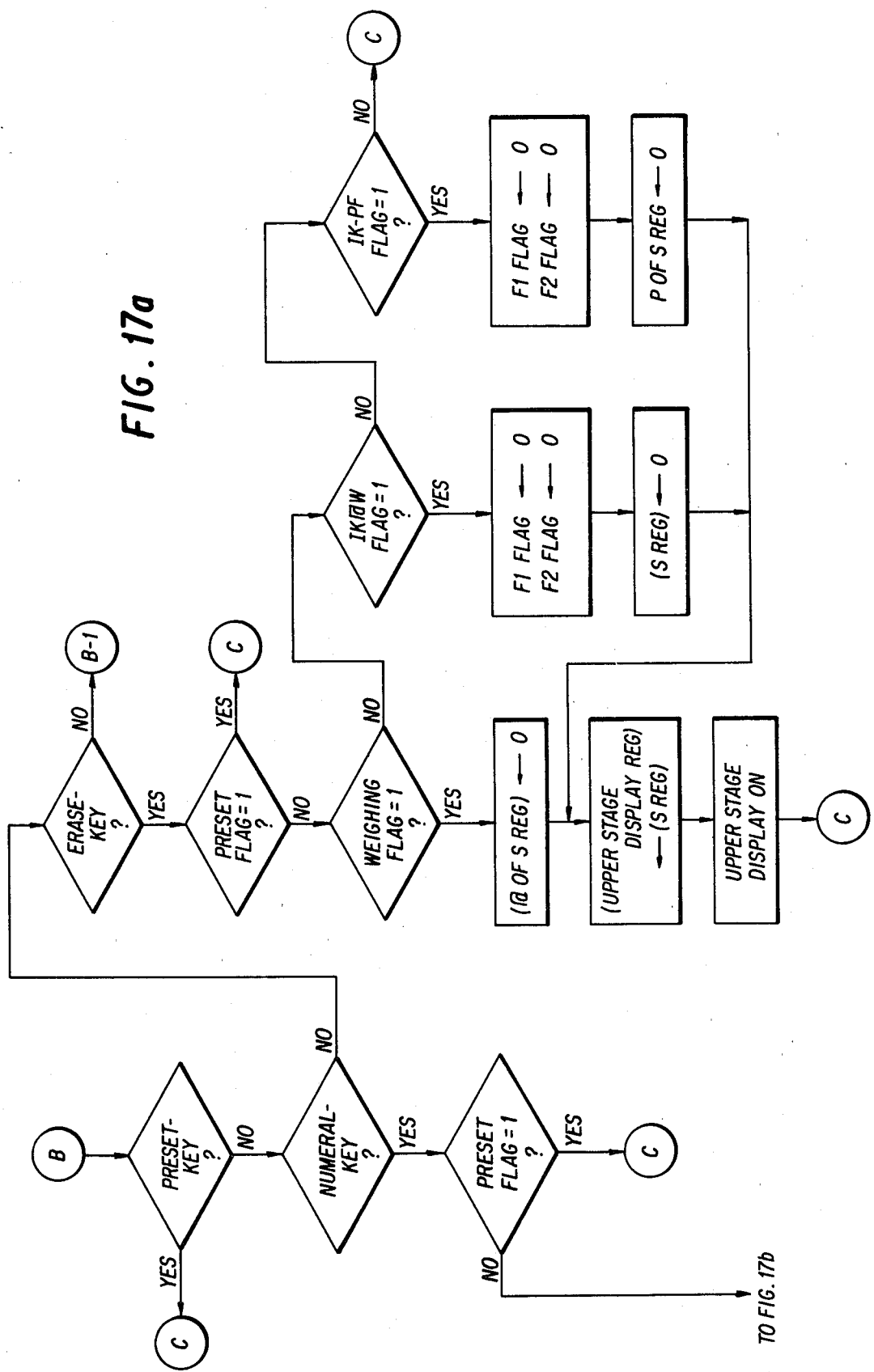

CONVEYOR CONTROL APPARATUS IN A FULLY AUTOMATIC LABELING SYSTEM

BACKGROUND OF THE INVENTION

1. Field Of The Invention

This invention relates to a conveyor control apparatus in a fully automatic labeling system wherein commodities are successively sent in to have their weights measured and wherein labels, are automatically attached, which contain printed data corresponding to the measured values.

2. Description of the Prior Art

In general, fully automatic labeling system of this type comprises a sending-in conveyor which sends a commodity in, a weighing conveyor which measures the weight of the commodity, and a sticking conveyor on which data based on the measured value is printed on the commodity, the respective conveyors having their operations controlled independently. Accordingly the commodity is sent in in coordination with the timing of the operations of weighing and labeling. The prior-art system, however, has for its principal purpose to merely transport the commodity smoothly and is not suited to an actual situation in which the supply of the commodity ceases. More specifically, even when the supply of the commodity has ceased, the weighing conveyor and the sticking conveyor continue to operate, thus allowing the system to run at idle which results in problems with an increase in power dissipation and a reduced lifetime of the system decreases. The operation control itself of each conveyor is affected by the combination of a sensor for detecting the commodity and a timer. The time set on the timer changes greatly depending upon external conditions such as temperature changes. Furthermore, the exactness of the weighing and the safety of the control of the conveyor operation is uncertain. The operation control functions to signify that two commodities are placed on the weighing conveyor or that an interval arises between the sequence of transportation timings. There is the contradiction that when accuracy increases, the efficiency is decreased because of the amount of time necessary to increase accuracy, whereas when the efficiency is enhanced, accuracy is sacrificed. Also in the full-auto labeling system, a print fixing operation in which the print content is fixed is sometimes carried out. In this case, the conveyors form a mere transportation passage, and it is difficult to reliably perform the commodity transportation conforming with the label issuing timing.

Further, when there is a large quantity information to be printed on a label therefore it cannot be printed with the one-stage print, and hence, a two-stage print must be performed. In case of the two-stage print, the printing time naturally becomes long, and the commodity transportation interval is set in compliance with the timing of the two-stage print in the prior-art system. Therefore, the efficiency becomes very low when the one-stage print is adopted. In order to raise the efficiency, a circuit is necessary which is separately operated by change-over from a one-stage print to a two-stage print.

SUMMARY OF THE INVENTION

A first object of this invention is to efficiently and automatically execute the respective operations of sending-in, weighing and labeling of a commodity with a reduced time loss by utilizing a sending-in conveyor, a weighing conveyor and a sticking conveyor which have their operations controlled independently.

A second object of this invention is to stop a weighing conveyor and a sticking conveyor when a commodity has not been fed in for a predetermined time, thereby making it possible to eliminate any useless continued motion of the system.

A third object of this invention is to prevent two or more commodities from being placed on a weighing conveyor and also to shorten the period of time during which no commodity is weighed thereby to efficiently perform a weighing operation.

A fourth object of this invention is to control a commodity transportation interval by utilizing a load cell output even in a print fixing operation in which a print content is fixed and the operation of a load cell is unnecessary, so as to match the timing of the commodity transportation and labeling with the label issue.

A fifth object of this invention is to attain a high efficiency by setting the transporting speed of a sticking conveyor so as to permit labeling without stopping the sticking conveyor in the one-stage print.

A sixth object of this invention is to temporarily stop a sticking conveyor in order to sufficiently allow for a period of time required for a two-stage printing operation for the label assuming that the sticking conveyor is continuously operated in case of a one-stage print.

A seventh object of this invention is to delay a start timing of a sending-in conveyor and substantially lengthen the transporting interval of a commodity when the print for a label is two-stage print, thereby automatically excluding the disruption of the flow of the commodities.

An eighth object of this invention is to continue the operation of a load cell even when no commodity is flowing, to thereby stabilize the operation.

BRIEF DESCRIPTION OF THE DRAWING

FIG. 1 is a side view showing the outline of the construction of an auto labeling system.
FIG. 6 is a plan view of a label obtained by the one-stage print.
FIG. 8 is a plan view of a label obtained by the two-stage print.
FIG. 11 is a flow chart of the interrupt of a $V_2$ sensor.

DETAILED DESCRIPTION OF THE PREFERRED EMBODIMENTS

Figure 2A:
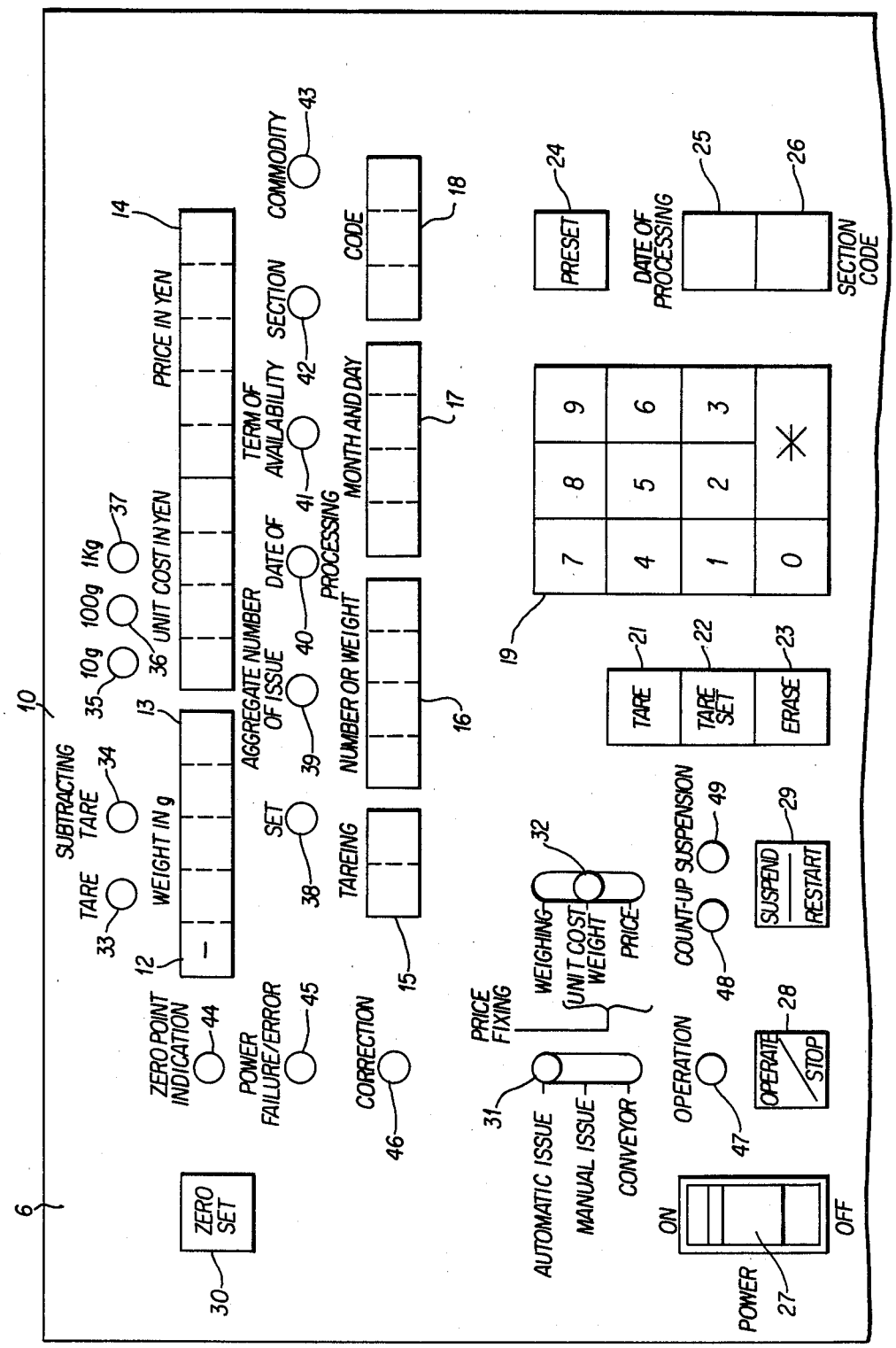
FIG. 2 is a front view of an operation panel.

An embodiment of this invention will be described with reference to the drawings. Shown in FIG. 1 is a diagram of the general construction of an auto labeling system AL. A conveyor $V_1$ (1), a conveyor $V_2$ (2) and a conveyor $V_3$ (3) are disposed in alignment. The conveyor $V_1$ (1) is a sending-in conveyor for a commodity which is aligned to a packaging machine not shown, the conveyor V₂ (2) is a weighing conveyor which is placed on a load cell SL (4) serving as a scale to weigh the commodity being measured on the conveyor V₂, and the conveyor V₃ (3) is a sticking conveyor which sticks a label to the commodity by means of a sticking mechanism of a label printer (5) disposed by the side thereof. By the side of the conveyor V₂ (2), an operation unit (6) which is provided with various operating keys and display portions to be stated later is disposed. Over the conveyors V₁ (1), V₂ (2) and V₃ (3), a V₁ sensor (7), a V₂ sensor (8) and a V₃ sensor (9) are respectively disposed to photoelectrically detect the passage of the commodity. The V₁ sensor (7) operates to inhibit the transfer of another commodity while the aforesaid commodity exists on the conveyor V₂ (2). Therefore, the spacing between the V₁ sensor (7) and the V₂ sensor (i) is set at an interval enough to perform one weighing.

Now, the construction of an operation panel (10) of the operation unit (6) will be described with reference to FIG. 2. In the upper part of the operation panel (10), display tubes (11) divided into two stages are disposed. The upper stage of the display tubes (11) is subdivided into a weight display portion (12), a unit cost display portion (13) and a price display portion (14), while the lower stage is subdivided into a tare display portion (15), a number or weight display portion (16), a month and day display portion (17) and a code display portion (18). Below and on the left of such display tubes (11), there are disposed numeral keys of 0–9 (19), an execute key (20), a tare key (21), a tare set key (22), an erase key (23), a preset key (24), a date-of-processing key (25), a section code key (26), a power switch (27), an operate/-stop key (28), a suspend-restart key (29) and a zero set key (30). A change-over switch (31) is disposed which effects change-over among automatic issue, manual issue, and conveyor continuous running, while a change-over switch (32) is disposed which effects change-over among weighing, print fixing for unit cost and weight, and print fixing for price. Further, there are disposed various lamps which indicate the items or operating states of display contents respectively. These lamps are a "taring" lamp (33), a "subtracting tare" lamp (34), a 10 gr lamp (35), a 100 gr lamp (36) and a 1 Kg lamp (37), the lamps (35) to (37) indicating the standards of unit costs, a set lamp (38), an "aggregate number of issue" lamp (39), a "date of processing" lamp (40), a "term of availability" lamp (41), a section lamp (42), a commodity lamp (43), a zero point indication lamp (44), a power failure/error lamp (45), a correction lamp (46), an operation lamp (47), a count-up lamp (48) and a suspension lamp (49). On the other hand, in the lower part of the operation panel (10), there are disposed a unit cost and tare calling key (50), a unit cost storing key (51), a tare storing key (52), a commodity code key (53), a subtotal check key (54), a subtotal reckon key (55), a total check key (56), a total reckon key (57), a correct + key (58), a correct − key (59), a "term of availability" key (60) and an "aggregate number of issue" key (61). On the left of them, eight print control switches (62) are disposed which set whether the date of processing, unit cost, weight, price, section, term of availability, commodity and tare are to be printed or erased. Disposed below the print control switches (62) are a unit cost change-over switch (63) which sets the standard value of the unit cost display portion (13), an addition switch (64) which makes an addition control, a tare subtraction forcing switch (65) which controls the subtraction of tare, and a subtotal/total print switch (66) which changes-over the print of subtotal/total between the weight and price. Further, there is disposed a two-stage print switch (67) which sets the print for the label to either one-stage print or two-stage print and which adjusts the amount of feed at the two-stage print, three sensitivity adjustment knobs (68) which adjust the sensitivities of the respective sensors, and a sticking position adjustment knob (69) which adjusts the label sticking position of the commodity. An auxiliary lamp (70), a weighing lamp (71) and a sticking lamp (72) are disposed in correspondence with the sensitivity adjustment knobs (68).

The numeral (100) indicates a preset content change-over switch which effects change-over between weight preset and number preset and which is mounted inside the operation unit (6).

Figure 3:
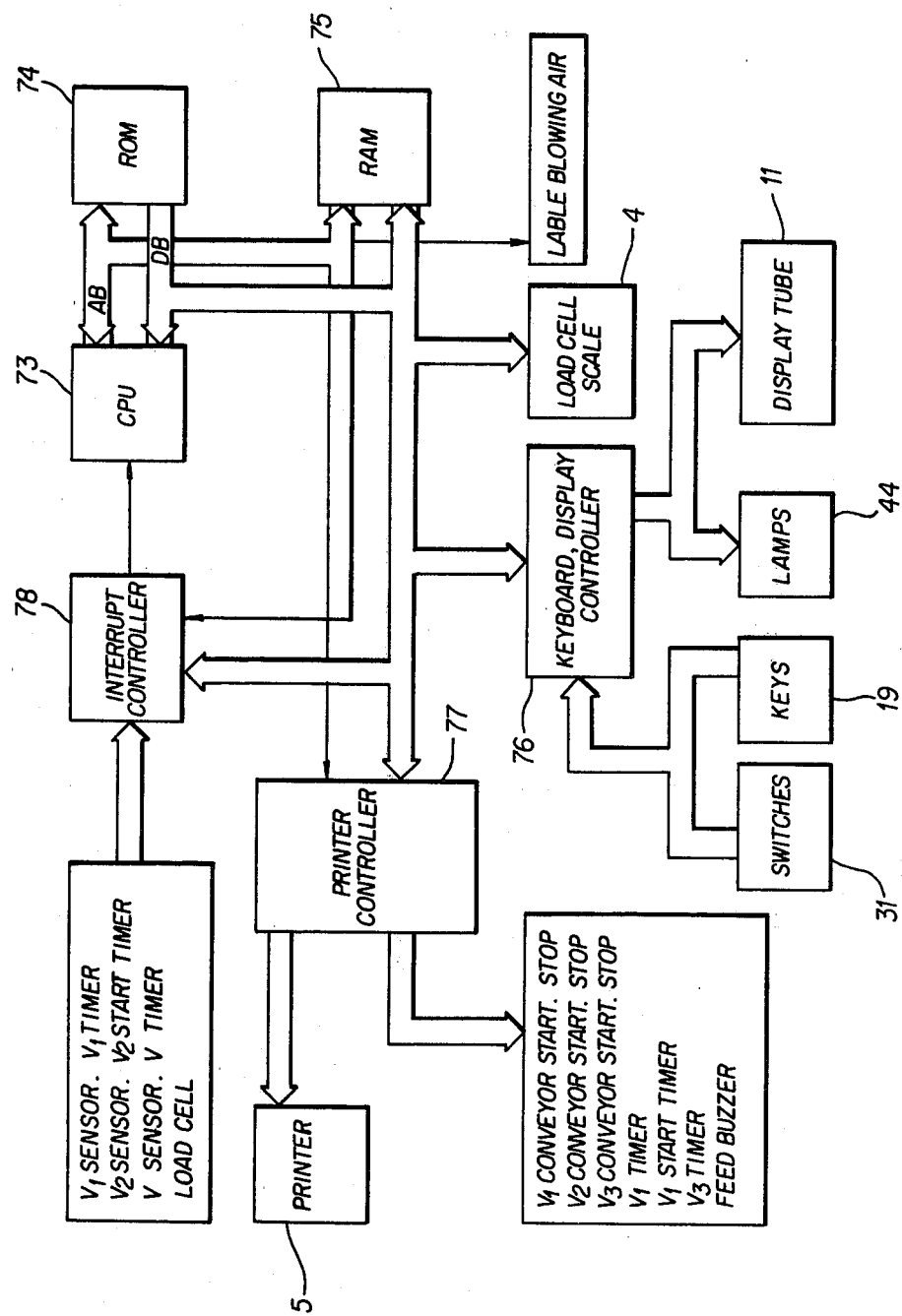
FIG. 3 is a block diagram of electronic circuitry.

Referring now to FIG. 3, electronic circuitry disposed in the operation unit (6) will be described. A central processing unit (73) (hereinbelow, termed CPU (73)) is disposed, to which a ROM (74), a RAM (75), the load cell SL (4), a keyboard display controller (76), a printer controller (77) and an interrupt controller (78) are respectively connected. The keyboard display controller (76) has the switch (31) and other various switches and the numeral keys (19) and other various keys connected thereto, and is connected to the zero point indication lamp (44) and other various lamps and the display tubes (11). The printer controller (77) has the label printer (5) connected thereto, and is connected to various control portions for the start/stop of the conveyor V₁ (1), the start/stop of the conveyor V₂ (2), the start/stop of the conveyor V₃ (3), a V₁ timer, a V₁ start timer, a V₃ timer, feed, and a buzzer. Further, the V₁ sensor (7), the V₂ sensor (8), the V₃ sensor (9), the V₁ timer, the V₁ start timer, the V₃ timer, and the load cell SL (4) are connected to the interrupt controller (78).

Figure 4:
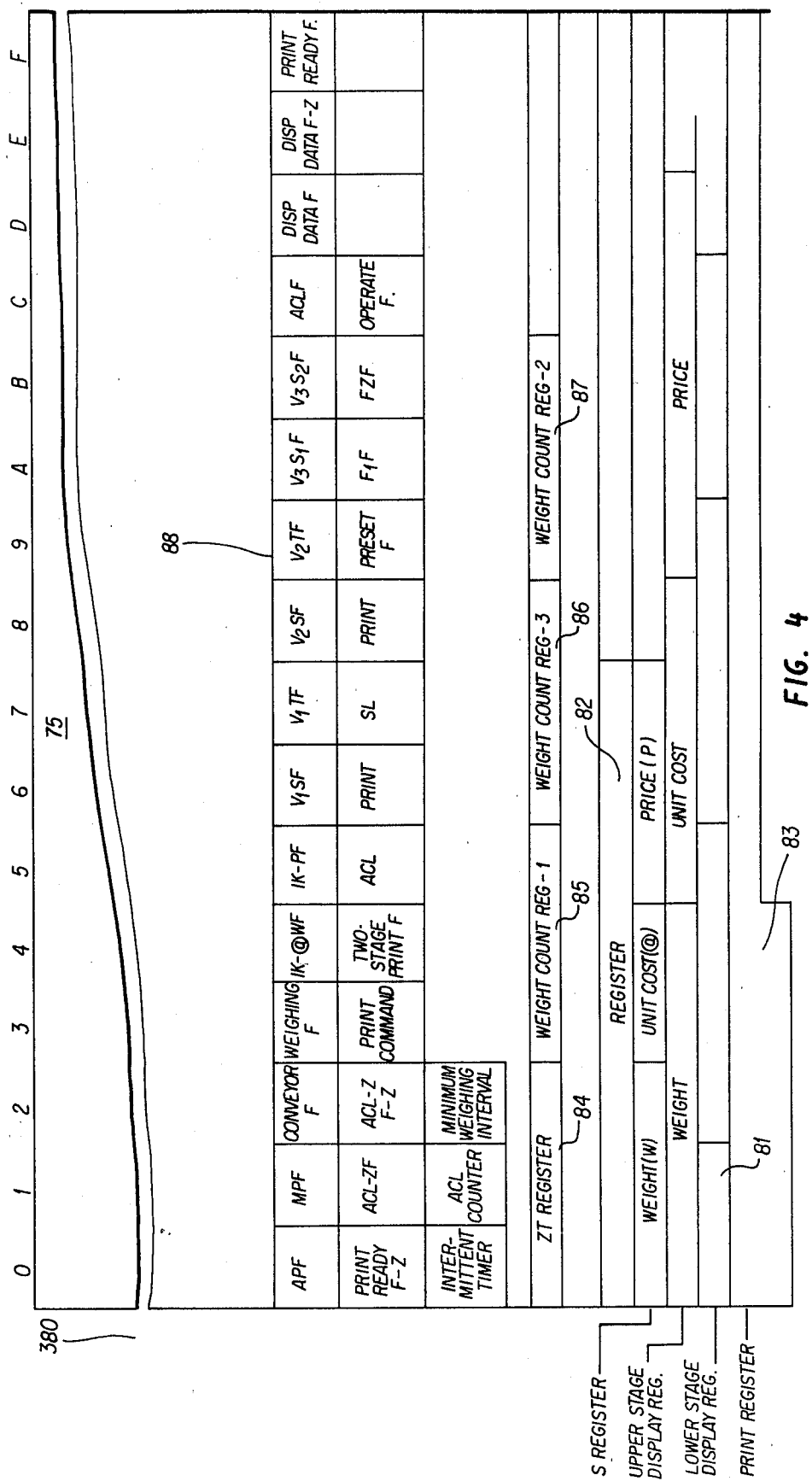
FIG. 4 is a RAM map.

FIG. 4 shows a RAM map. It includes an S register (79) which stores weight, unit cost and price, an upper-stage display register (80) and lower-stage display register (81) which stores and displays them, a register (82), a print register (83), a ZT register (84), a wait count register-1 (85), a wait count register-3 (86) and a wait count register-2 (87). In the upper part, flag columns (88) are provided. In these flag columns (88), there are set an automatic issue flag APF, manual issue flag MPF, conveyor flag F, weighing F, print fixing flag for unit cost and weight IK-@WF, print fixing flag for price IK-PF, V₁ sensor (7) flag V₁SF, V₁ timer flag V₁TF, V₂SF, V₂TF, V₃S₁F, V₃S₂F, auto-zero flag ACLF, display data F, display data F-2, print ready F, print ready-2F, ACLF-2, ACL-2F-2, print command F, two-stage print F, ACL end F, print data-1F, SL start F, print data-2F, print set F, F1F, F2F, operating F, intermittent timer F, ACL counter, minimum weighing interval F, etc.

Figure 5:
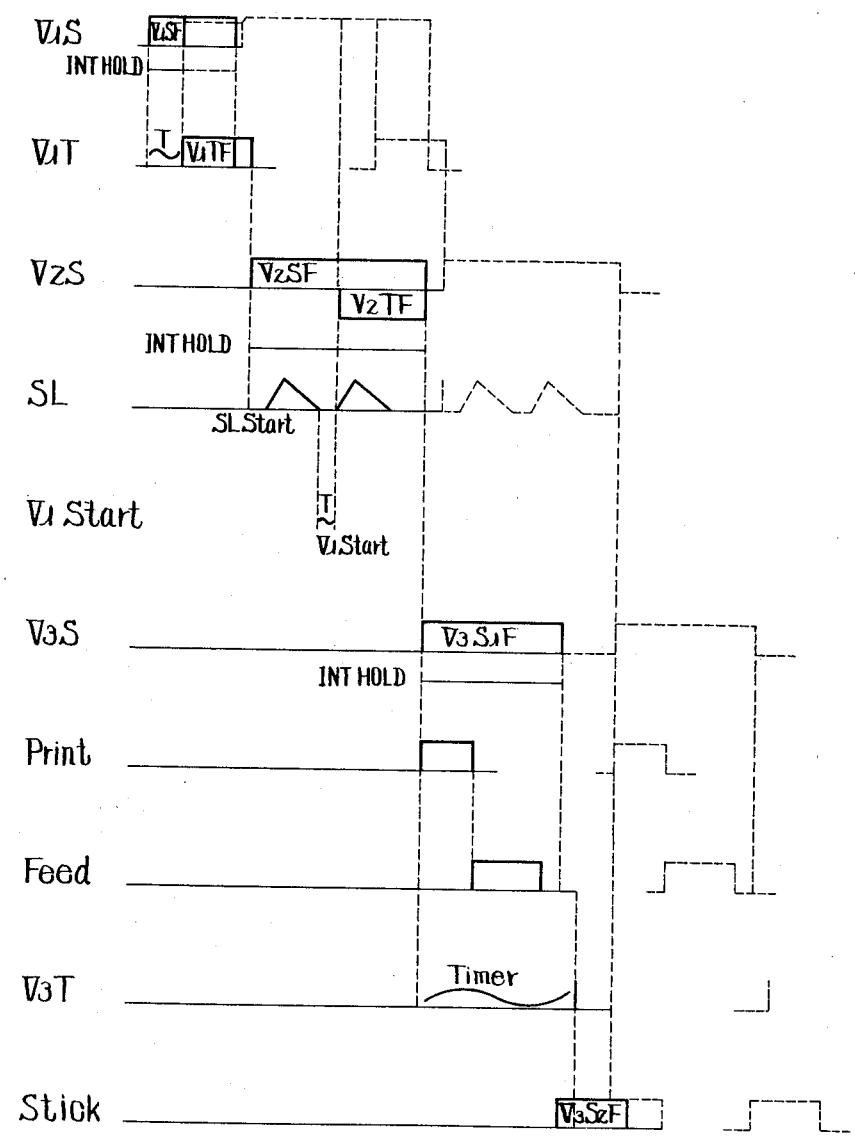
FIG. 5 is a timing chart in the case of one-stage print.

Referring now to FIG. 5, there will be described the timings of various portions of the system in the case of issuing a label of one-stage print (89) as shown in FIG. 6. The prints at this time are the date of processing, unit cost, weight, price, section code, etc. When the V₁ sensor (7) (indicated as V₁S) has detected the commodity, V₁SF is erected, and simultaneously, the V₁ timer (V₁T) sets a fixed time T, whereupon V₁TF is erected. Upon the time-up of V₁T, V₁SF=0 holds, and when the V₂ sensor (8) has detected the commodity, V₂SF is erected and simultaneously the load cell SL (4) is started. The conveyor V₁ (1) is started by the first signal of the load cell SL (4), and simultaneously, $V_2SF=0$ is established and $V_2TF$ is erected. The load cell SL (4) is set so as to infallibly generate the second signal, and the storage of the weighing data and other necessary operations are performed with the second signal. Subsequently, when the commodity has been detected by the $V_3$ sensor (9) ($V_3S$), it is simultaneously carried out to erect $V_3S_1F$, to initiate the print operation and to start the $V_3$ timer ($V_3T$). In a set time by the $V_3$ timer, the label feed is executed at the same time as the termination of the print. After the label feed has terminated, the label is stuck (at Stick) upon the set-up of the $V_3$ timer subject to $V_3S_2F=1$ which is formed by a main routine to be stated later. A part indicated as INT HOLD signifies that various interruptions to be stated later are executed.

Figure 7:
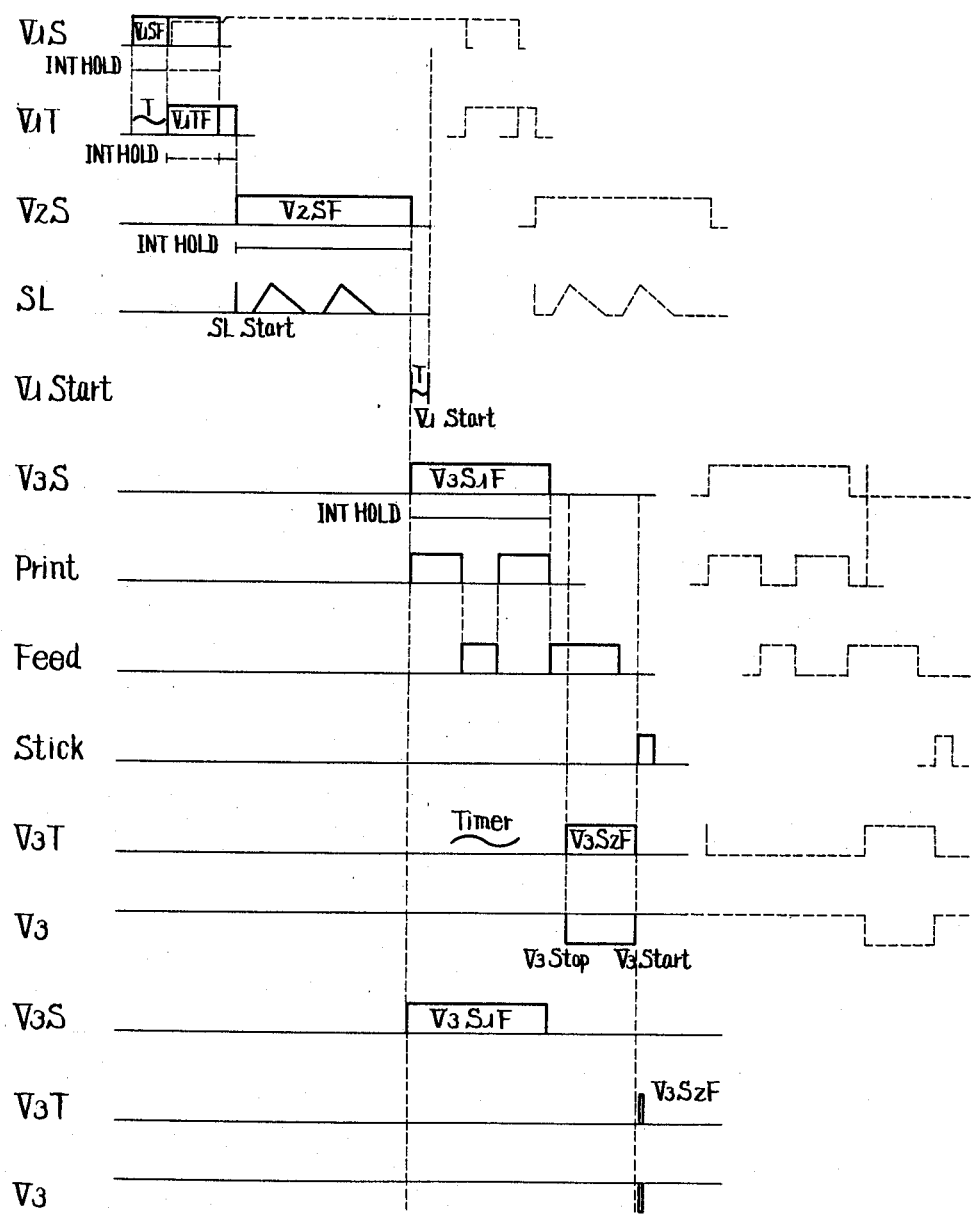
FIG. 7 is a timing chart in the case of two-stage print.

Referring now to FIG. 7, there will be described the timings of various portions of the system in the case of issuing a label of two-stage print (90) as shown in FIG. 8. The prints at this time include the term of availability, tare, commodity code etc. printed at the second stage, besides the one-stage print described previously. The state from the commodity detection by the $V_1$ sensor (7) to the load cell SL (4) start is the same as shown in FIG. 5. The start of the conveyor $V_1$ (1) is executed upon lapse of the time T after $V_2SF=0$ has been established. When the $V_3$ sensor (9) has detected the commodity, $V_3S_1F=1$ is established to start the $V_3$ timer, and simultaneously, the first stage print is made, the first stage feed is made, the second stage print is made and the second stage feed is made. When the $V_3$ timer has timed up before the end of these operations, the arrival of the commodity at a label sticking position is indicated, and $V_3S_2F$ is erected to stop the conveyor $V_3$ (3). Since, at the time of the end of the second stage feed, the labeling has gotten ready, the labeling (STICK) is made after a fixed period from the time, and $V_3S_2F=0$ is established to restart the conveyor $V_3$ (3).

When, in the two-stage feed state, the $V_3$ timer does not set up by any cause, the conveyor $V_3$ (3) is not stopped and the continuous running is kept. However, at the time when the $V_3$ timer has set up later, the label is stuck under the running state of the conveyor $V_3$ (3).

Figure 9:
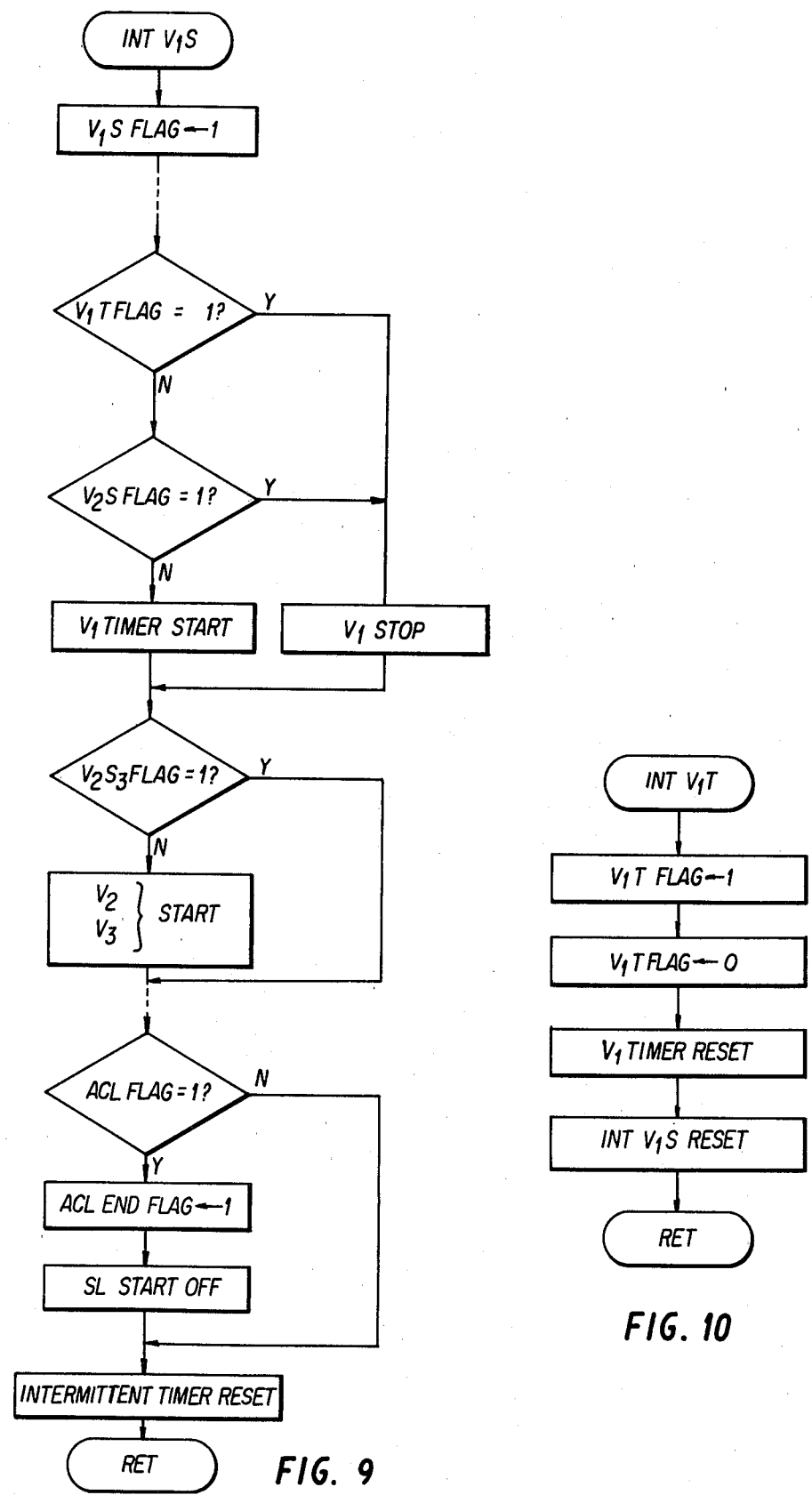
FIG. 9 is a flow chart of the interrupt of a $V_1$ sensor.

The various interrupting operations will be described with reference to FIGS. 9 to 15. First, FIG. 9 shows the interrupt INT $V_1S$ of the $V_1$ sensor (7). Under this state, $V_1SF=1$ is established, and a check as to whether $V_1TF=1$ and a check as to whether $V_2SF=1$ are successively performed. When either stands erect, the conveyor $V_1$ (1) is stopped, and when neither stands erect, the $V_1$ timer is started. Subsequently, the check of $V_3S_2F$ as to whether the $V_3$ sensor (9) is detecting the commodity is made. When $V_3S_2F=0$ holds, the conveyor $V_2$ (2) and the conveyor $V_3$ (3) are started. When $V_3S_2F=1$ holds, the starts of the conveyor $V_2$ (2) and the conveyor $V_3$ (3) are jumped, and ACLF as to whether the auto-zero state holds is checked. When $ACLF=0$ holds, the intermittent timer is reset, and a return is made. When $ACLF=1$ holds, the ACL end $F=1$ is established and the load cell SL (4) start is turned "off", whereupon the intermittent timer is reset and the return is made.

Figure 10:
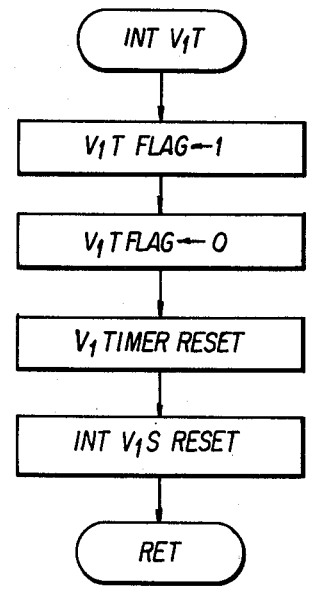
FIG. 10 is a flow chart of the interrupt of a $V_1$ timer.

Next, FIG. 10 shows the interrupt of the $V_1$ timer. When this has been received, $V_1TF=1$ is established, $V_1SF=0$ is established, the $V_1$ timer is reset and INT $V_1S$ is reset.

FIG. 11 shows the interrupt of the $V_2$ sensor (8). When this has been received, $V_2SF=1$ is established and $V_1TF=0$ is established, whereupon the weighing F is checked. If the weighing $F=1$, the print data $1F=1$ is established, the load cell SL (4) is started and a return is made. If the weighing $F=0$, the SL start $F=1$ is established, the load cell SL (4) is started and then turned "off", and the return is made. Also in the case of the print fixing, accordingly, the load cell SL (4) is also started for the automatic weighing operation, whereby the start timings of the various works are made quite similar to those of the automatic weighing.

Figure 12:
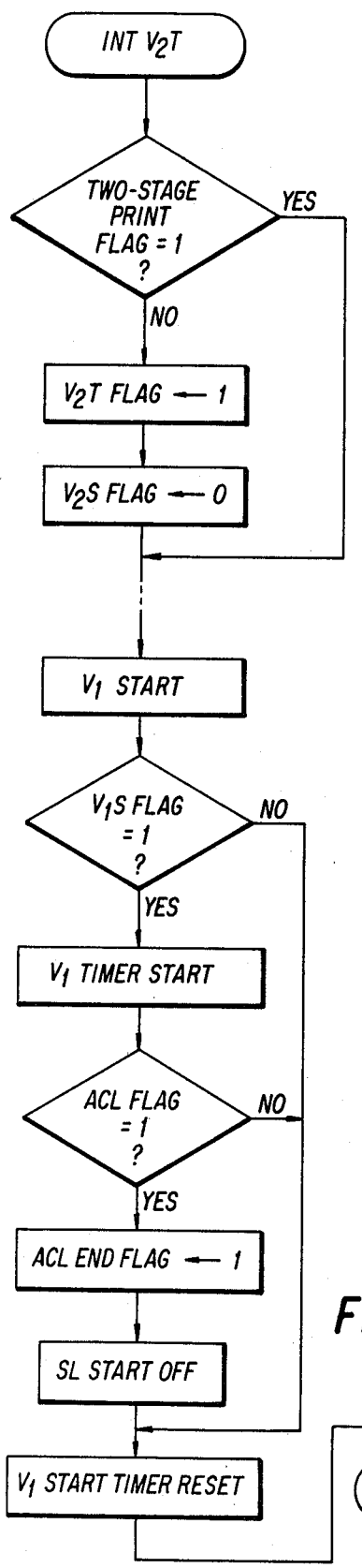
FIG. 12 is a flow chart of the interrupt of a $V_2$ timer.

Further, FIG. 12 shows the interrupt of the $V_2$ timer. At this time, the two-stage print F is checked as to whether the two-stage print switch (67) turns "on". In case of the two-stage print, the conveyor $V_1$ (1) is started in accordance with the commodity detection state of the $V_3$ sensor (9) to be stated later, while in case of the one-stage print, $V_2TF=1$ is established, $V_2SF=0$ is established and then the conveyor $V_1$ (1) is started. Thereafter, $V_1SF$ is checked. When $V_1SF=0$ holds, the $V_1$ start timer is reset and a return is made, and when $V_1SF=1$ holds, the $V_1$ timer start is made and ACLF is checked. When the auto zero is not indicated, the $V_1$ start timer is reset and the return is made as described previously. When $ACLF=1$ holds, the ACLF end $F=1$ is established and the load cell SL (4) is started and turned "off", whereupon the $V_1$ start timer is reset and the return is made.

Figure 13:
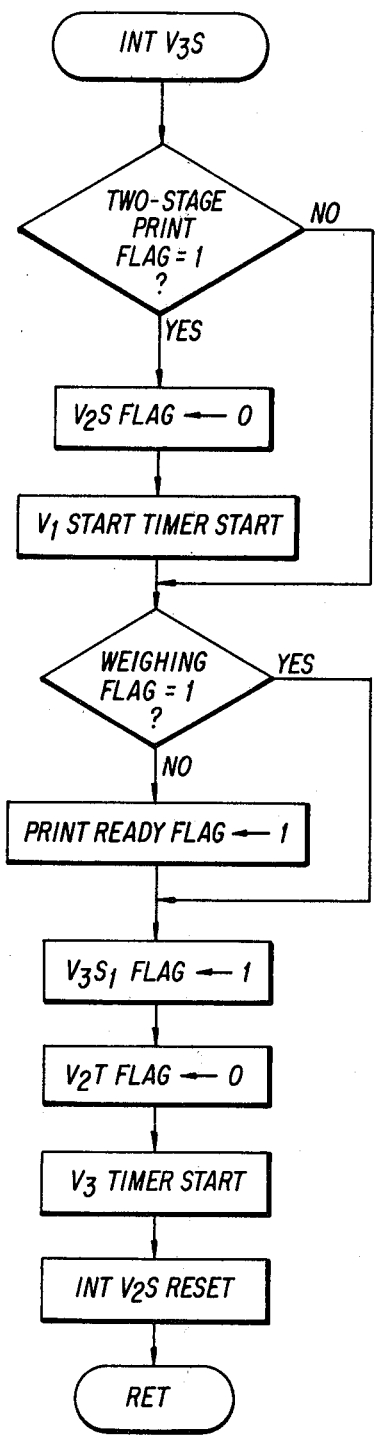
FIG. 13 is a flow chart of the interrupt of a $V_3$ sensor.

FIG. 13 shows the interrupt of the $V_3$ sensor (9). When this has been received, the two-stage print F is checked. If the two-stage print $F=1$, $V_2SF=0$ is established and the $V_1$ start timer is started, and if the two-stage print $F=0$, they are jumped and the weighing F is checked. If the weighing $F=0$ holds, the print ready F is erected, and if the weighing $F=1$ holds, it is jumped, $V_3S_1F=1$ is established, $V_2TF=0$ is established, the $V_3$ timer is started, INT $V_2S$ is reset and a return is made.

Figure 14:
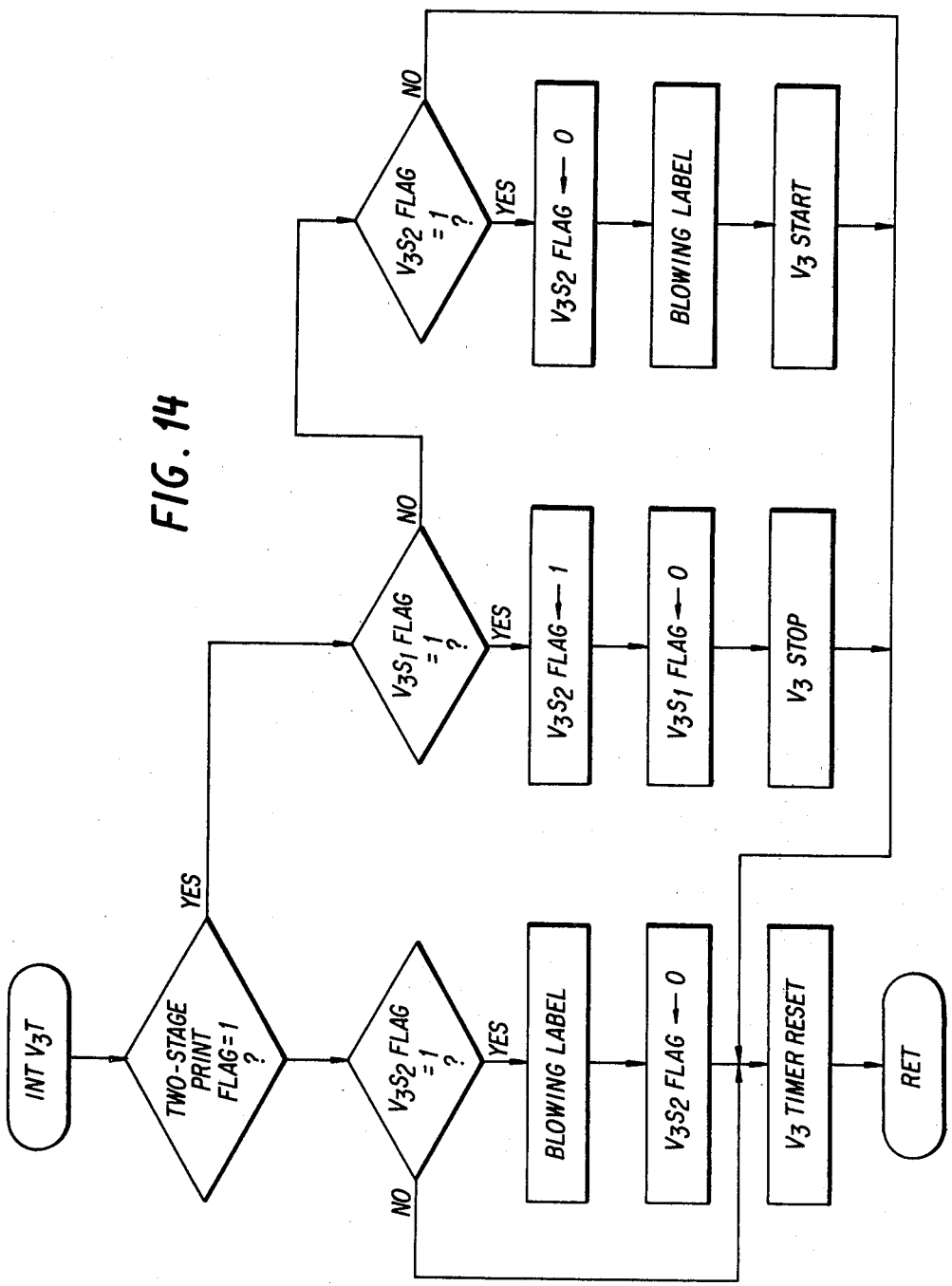
FIG. 14 is a flow chart of the interrupt of a $V_3$ timer.

FIG. 14 shows the interrupt of the $V_3$ timer. When this has entered, the two-stage print F is checked. When the two-stage print $F=0$, significant of the one-stage print state holds, the label is blown at $V_3S_2F=1$, to establish $V_3S_2F=0$. When $V_3S_2F=0$ holds, the $V_3$ timer is directly reset and a return is made. Subsequently, in case of the two-stage print state, that is, when the two-stage print $F=1$ holds, $V_3S_1F$ is checked. When $V_3S_1F=1$ holds, this indicates that the label issue has not been readied. At this time, $V_3S_2F=1$ is established, $V_3S_1F=0$ is established, the conveyor $V_3$ (3) is stopped, the $V_3$ timer is reset and thereafter the return is made. On the other hand, if $V_3S_1F=0$ holds, $V_3S_2F$ is checked. If $V_3S_2F=1$ holds, $V_3S_2F=0$ is established, whereupon the label is blown, the conveyor $V_3$ (3) is started, the $V_3$ timer is reset and the return is made.

Figure 15A:
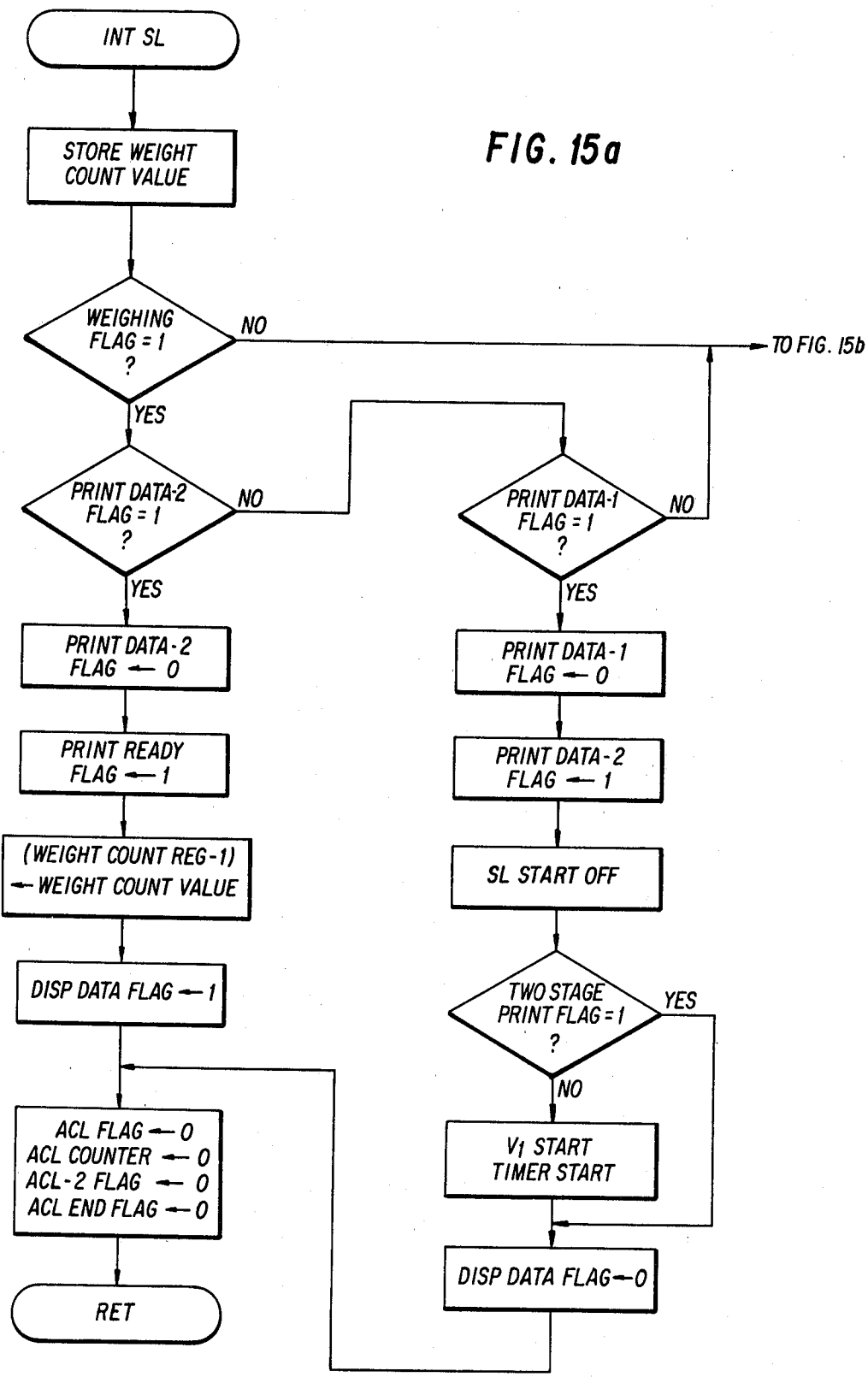
FIG. 15 is a flow chart of the interrupt of a load cell SL.
Figure 15B:
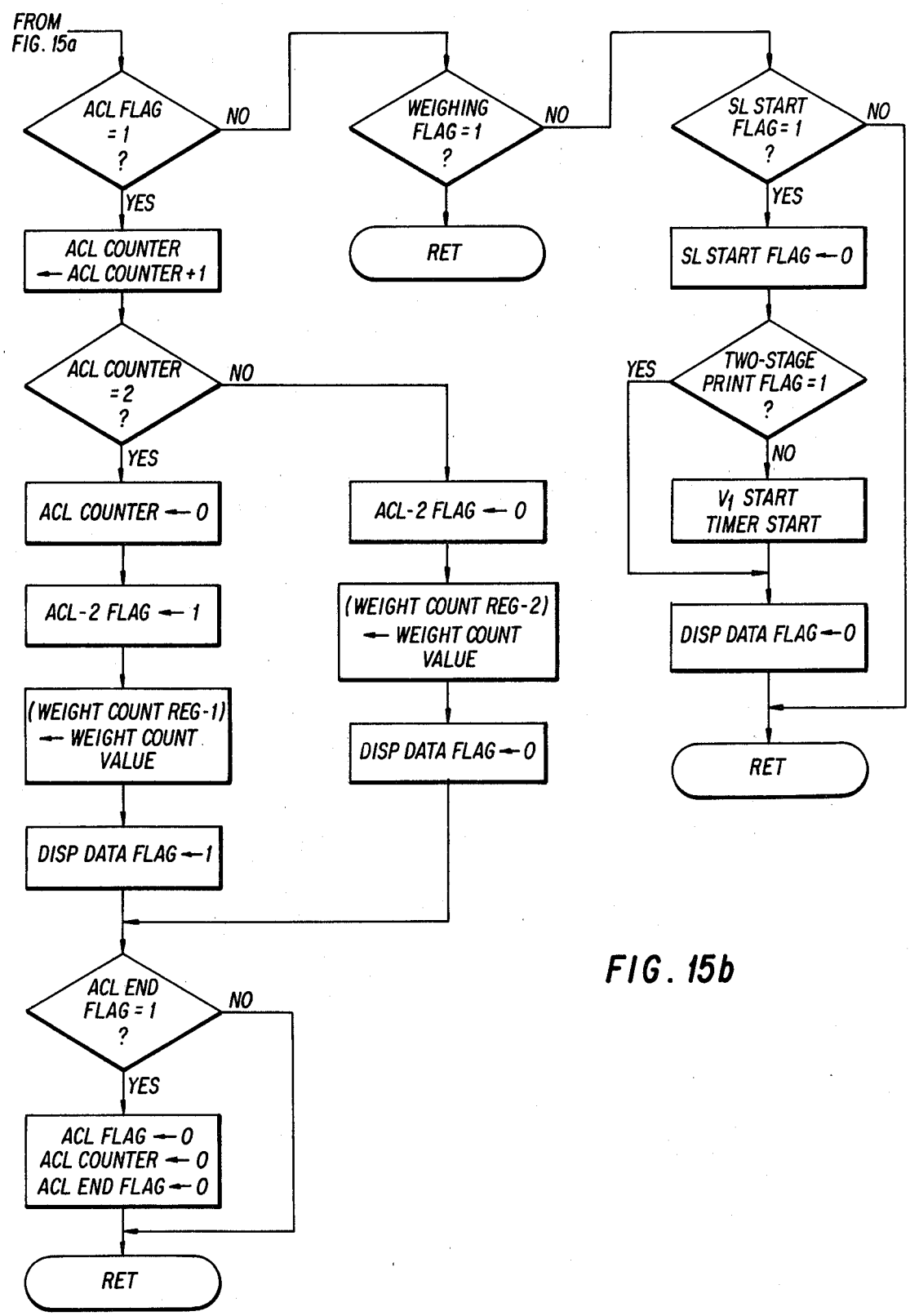

Referring now to FIG. 15, the interrupt of the load cell SL (4) will be described. After the start of the load cell SL (4), the weight count value is stored. Subsequently, the weighing F is checked. If the weighing $F=1$ holds, the print data-2 F is checked. If the print data-2 $F=1$ holds, it is first made zero, the print ready $F=1$ is established, the weight count value is put into the weight count register-1 (85), the display data $F=1$ is established, $ACLF=0$, ACL counter$=0$, ACL-2 $F=0$ and ACL end $F=0$ are established, and a return is made. On the other hand, if the aforecited print data-2 $F=0$ holds, the print data-1 F is checked. If the print data-1 $F=1$ holds, it is made zero, the print data-2 $F=1$ is established, and the load cell SL (4) is started and turned "off". When the two-stage print $F=0$ holds, the $V_1$ start timer is started, and when the two-stage print F=1 holds, it is jumped, the display data F=0 is established, and the return is made after establishing ACLF=0, ACL counter=0, ACL-2 F=0 and ACL end F=0 as stated previously.

Further, when the aforecited print data-1 F=0 or the aforecited weighing F=0 holds, ACLF is checked. If ACLF=1 holds, the ACL counter is subjected to +1, and whether ACL counter=2 holds is checked. If the ACL counter=2 holds, the ACL counter is made zero, ACL-2 F=1 is established, the weight count value is put into the weight count register-1 (85), and the display data F=1 is established. Unless the ACL counter=2 holds, ACL-2 F=0 is established, the weight count value is put into the weight count register-2 (87), and the display data F=0 is established. Subsequently, the ACL end F is checked. If the ACL end F=0 holds, the return is directly made, and if the ACL end F=1 holds, the return is made after establishing ACLF=0, ACL counter=0 and ACL end F=0.

Further, when ACLF=0 holds at the foregoing check of ACLF, the check of the weighing F is conducted again. If the weighing F=1 holds, the return is directly made, and if the weighing F=0 holds, the SL start F is checked. If SL start F=0 holds, the return is made, and if SL start F=1 holds, it is made zero, whereupon the two-stage print F is checked. If the two-stage print F=0 holds, the $V_1$ start timer is started, and if the two-stage print F=1 holds, it is jumped, the display data F=0 is established and the return is made. Such facts signify that, even in the case of the print fixing, the timings of the various works are set with reference to the start of the load cell SL (4).

Figure 16A:
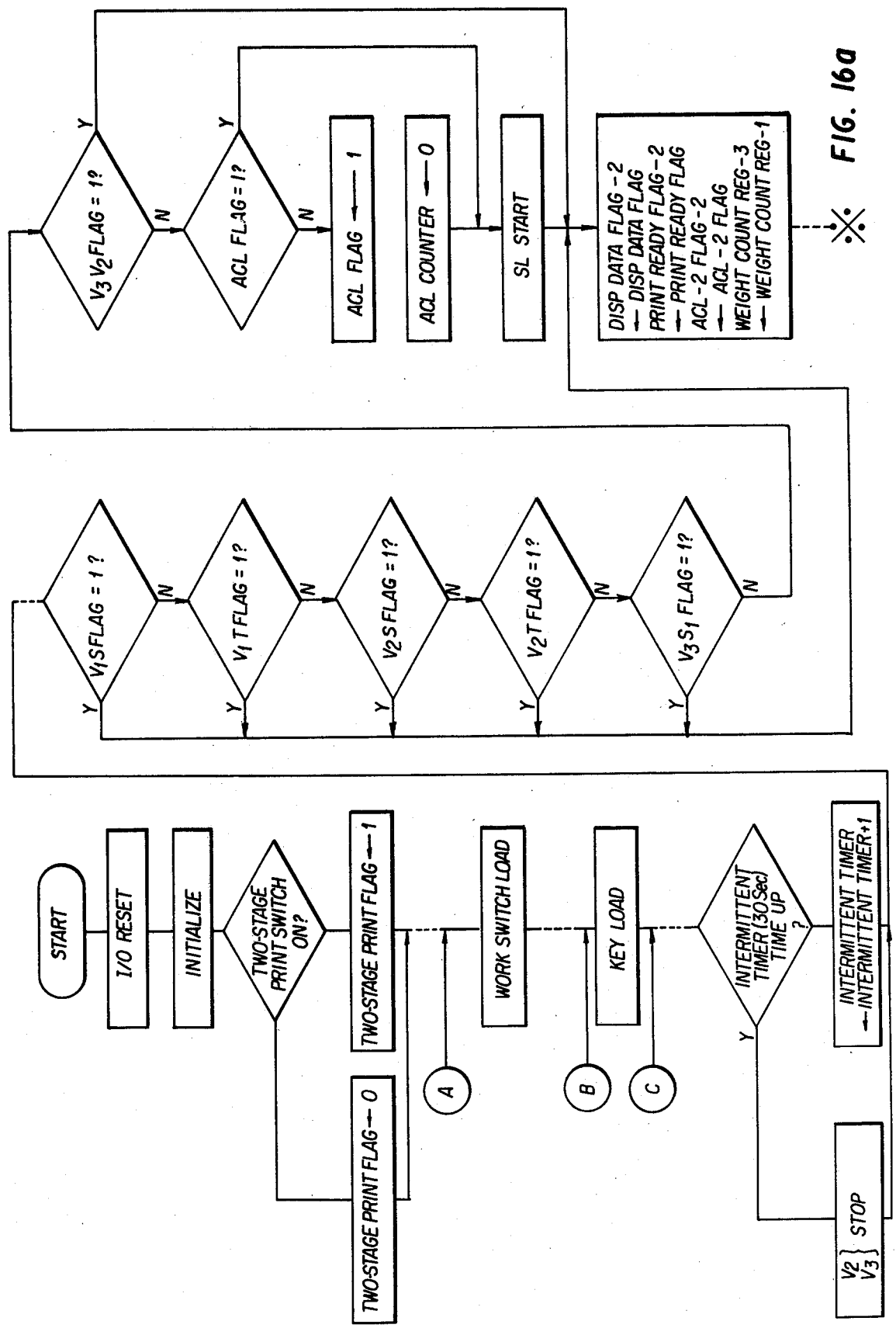
FIGS. 16 to 18 are flow charts of the main flow.
Figure 16B:
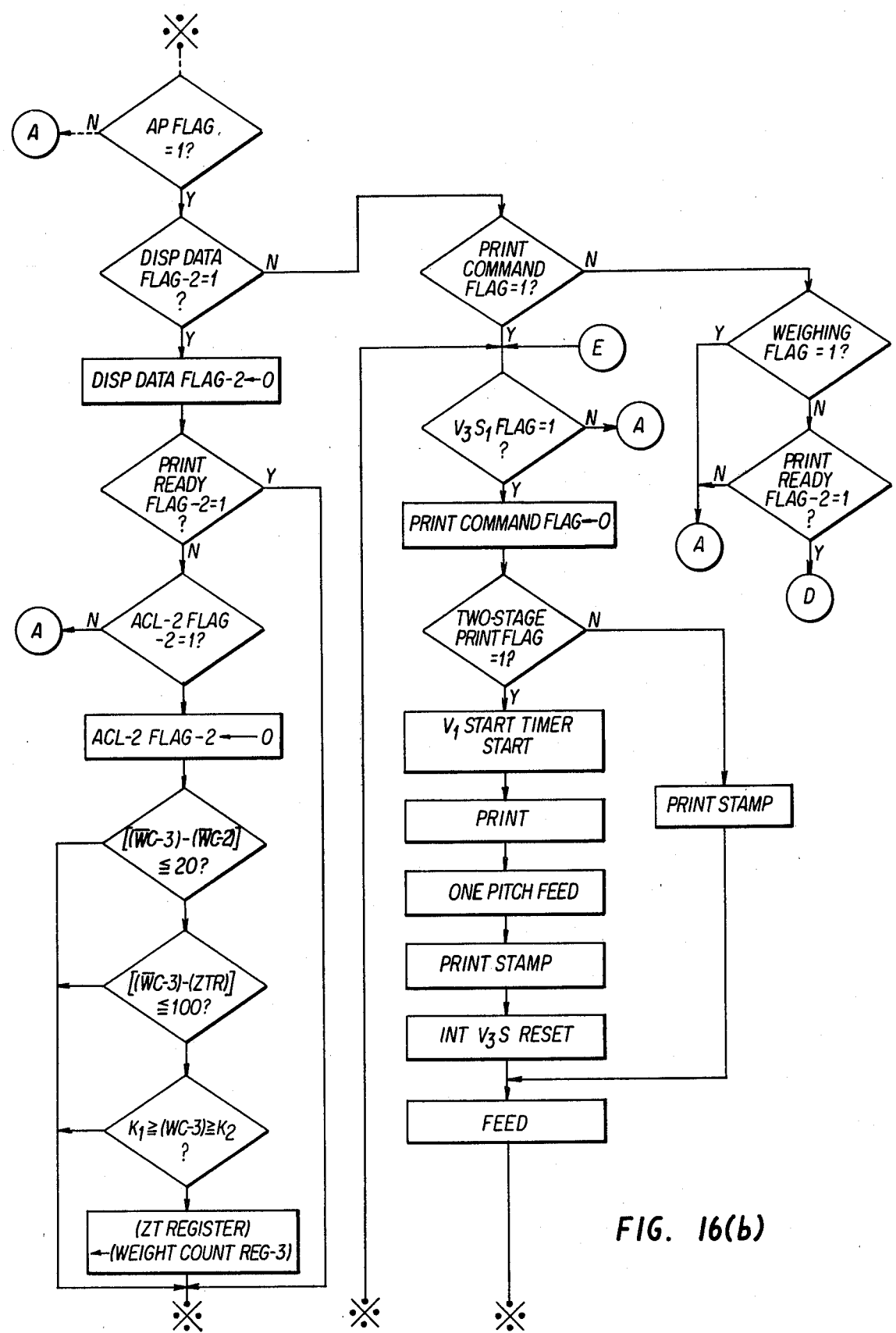
Figure 16C:
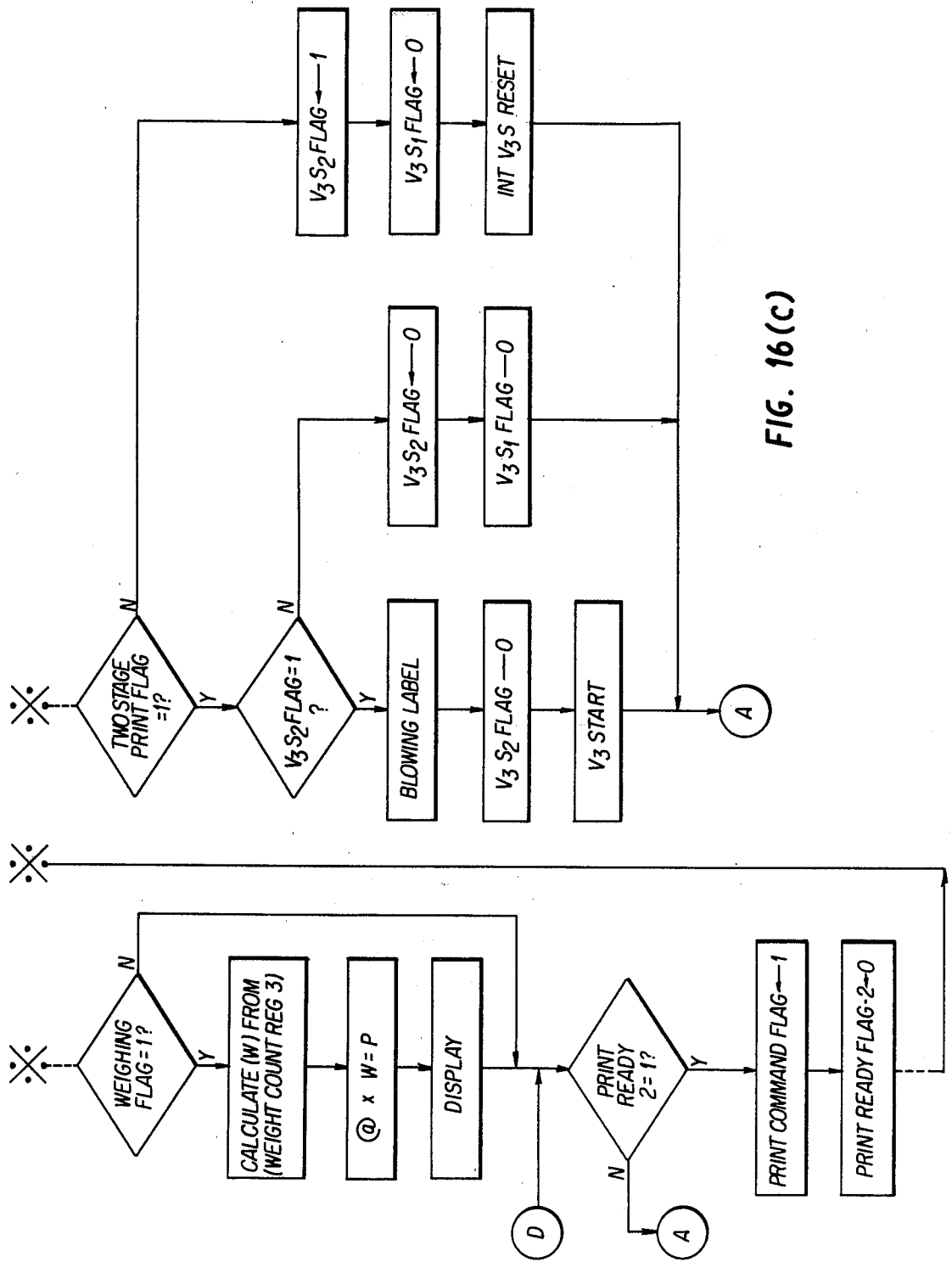

Now, the main flow will be described with reference to FIGS. 16 to 18. In FIG. 16, after closing the power switch (27), an I/O is reset and the various portions are initialized, and whether or not the two-stage print switch (67) turns "on" is checked. The flow reaches Ⓐ where the two-stage flag F=1 is established when the switch (67) turns "on" and the two-stage flag F=0 is established when it turns "off". In a section from Ⓐ to Ⓑ, work switches are loaded. As the contents of it is work switch load, the first determined whether the change-over switch (31) is in the position of the automatic issue to establish APF=1, it is in the position of the manual issue to establish MPF=1 or it is in the position of the conveyor to establish the conveyor F=1. Next it is determined is whether the change-over switch (32) is in the position of the weighing to establish the weighing F=1, it is in the position of the print fixing position for unit cost and weight to establish IK−@WF=1 or it is in the position of the print fixing position for price to establish IK−PF=1. Subsequently, the key load of contents illustrated in FIGS. 17 and 18 is made in a section between Ⓑ and Ⓒ.

Figure 17B:
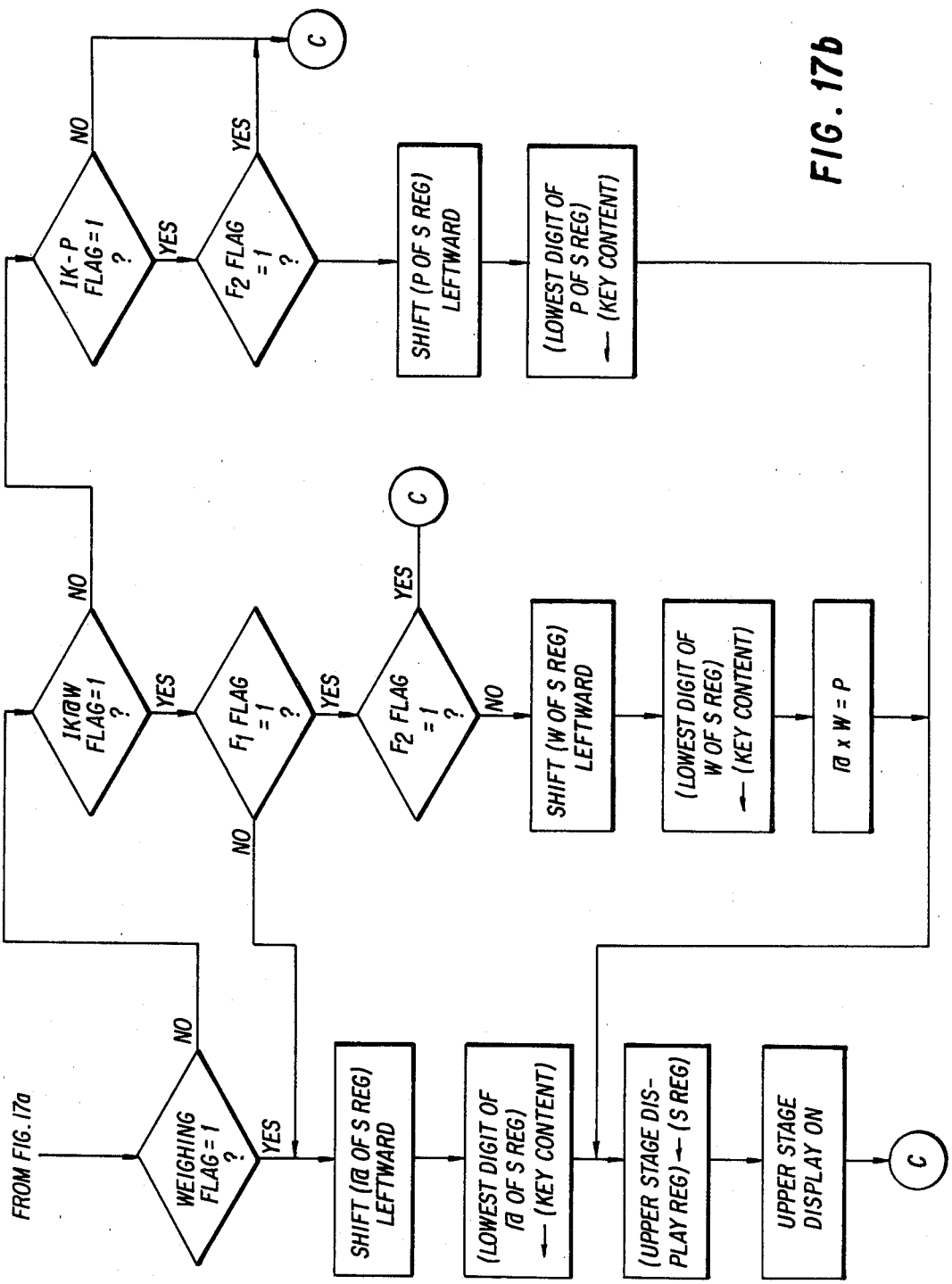
Figure 18A:
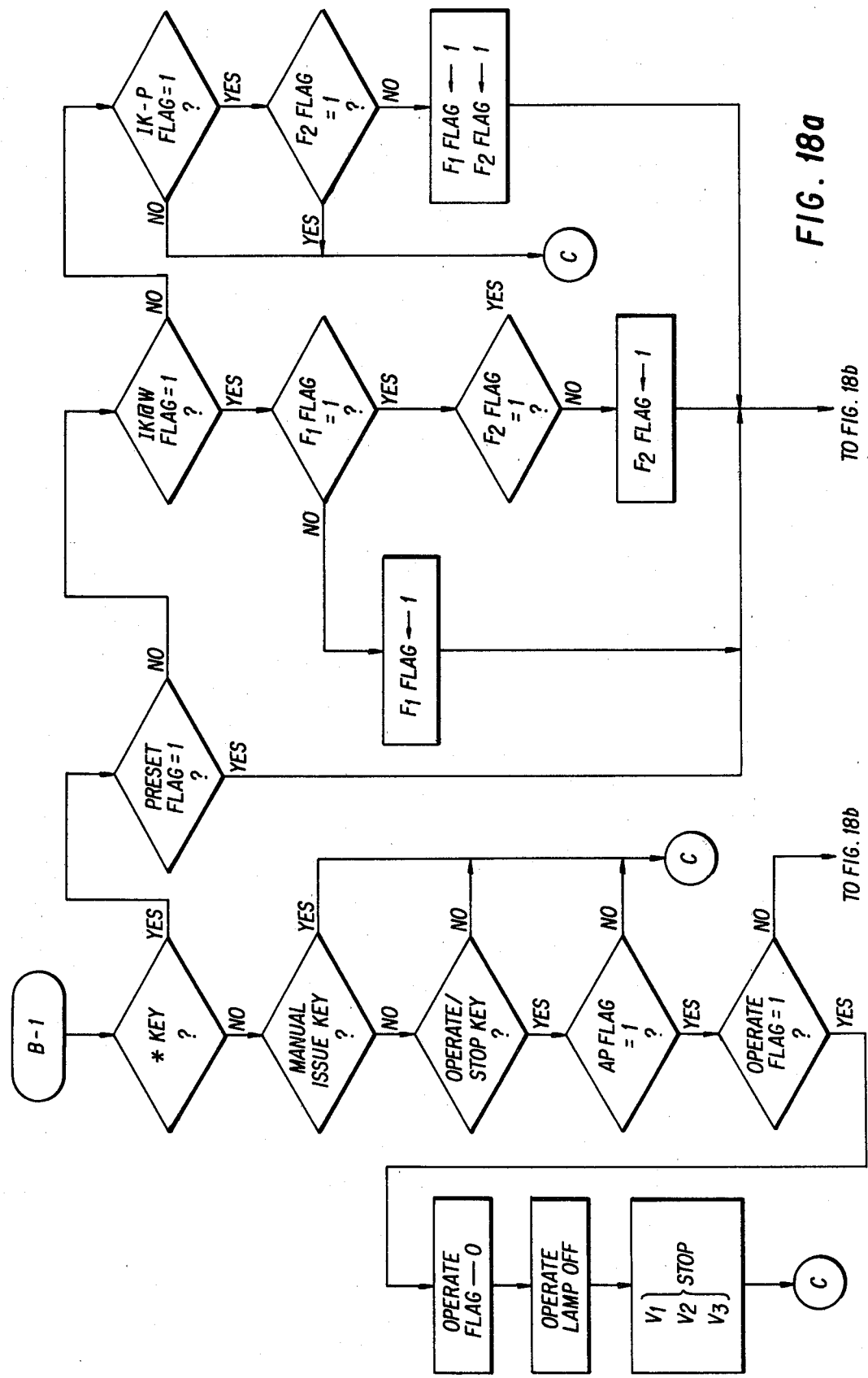
Figure 18B:
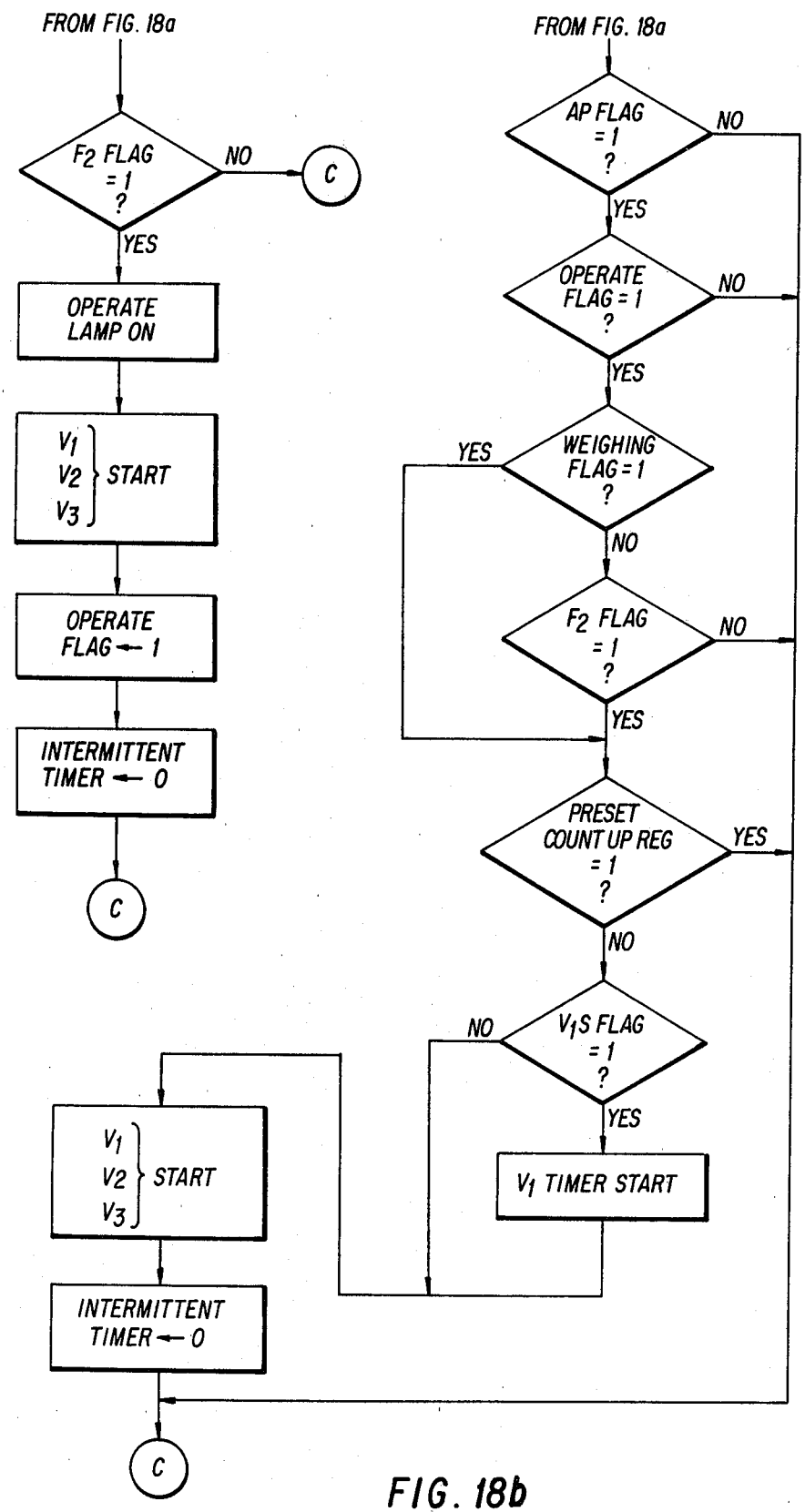

In FIG. 17, it is checked if the preset key (24) has been pushed. If it has been pushed, the flow shifts to Ⓒ after necessary works have been made, and if it has not been pushed, whether the numeral key (19) has been pushed is checked. First, the state in which the numeral key (19) has been pushed will be studied. The preset F is checked, and if the present F=1 holds, the flow shifts to Ⓒ after performing the preset work, whereas if the preset F=0 holds, the weighing F is checked. If the weighing F=1, the unit cost of the S register (79) is shifted leftwards, the key content is put into the least significant digit of the S register (79) and into the upper-stage display register (80), the upper-stage display is turned "on", and the flow shifts to Ⓒ.

If the weighing F=0, IK−@WF is checked, and if this flag IK−@WF=1, $F_1F$ is checked. When $F_1F=0$ holds, the same routine as in the foregoing case where the weighing F=1 holds is traced, and when $F_1F=1$ holds, F2F is checked. If F2F=1 holds, the flow shifts to Ⓒ. If F2F=0 holds, the weight W of the S register (79) is shifted leftwards, the key content is put into the least significant digit of the S register (79), the unit cost and the weight are multiplied to find the price P, the price P is put into the upper-stage display register (80), the upper-stage display is turned "on", and the flow shifts to Ⓒ.

Further, if the aforecited IK−@WF=0 holds, IK−PF is checked. If IK−PF=0 holds, the flow shifts to Ⓒ, and if IK−PF=1 holds, F2F is checked. If F2F=1 holds, the flow shifts to Ⓒ. If F2F=0 holds, the price P of the S register (79) is shifted leftwards, the key content is put into the least significant digit of the price of the S register (79), the resulting value is put into the upper-stage display register (80), the upper-stage display is turned "on", and the flow shifts to Ⓒ.

Referring back to the previous step, if the numeral key (19) is not pushed, the erase key (23) is checked. When the erase key (23) is not pushed, the flow falls into the state of FIG. 18 from a part indicated as (B-1). When the erase key (23) is pushed, the preset F is checked. If the preset F=1 holds, CC−SF=0 is established, zero is put into the register (82), the content of the register (82) is put into the lower-stage display register (81), the lower-stage display is turned "on", and the flow shifts to Ⓒ. If the preset F=0 holds, the weighing F is checked. If the weighing F=1 holds, zero is put into the unit cost part of the S register (79), the resulting content is put into the upper-stage display register (80), the upper-stage display is turned "on", and the flow shifts to Ⓒ. At this time, if the weighing F=0 hols, IK−@WF is checked. If IK−@WF=1 holds, F1F=0 and F2F=0 are established, zero is put into the S register (79), the upper-stage display is made with the upper-stage display register (80) made zero, and the flow shifts to Ⓒ. If IK−@WF=0 holds, IK−PF is checked. If IK−PF=0 holds, the flow shifts to Ⓒ, and if IK−PF=1 holds, F1F=0 and F2F=0 are established, the price part of the S register (79) is made zero, it is put into the upper-stage display register (80), the upper-stage display is made, and the flow shifts to Ⓒ.

Now, when neither the preset key (24), the numeral key (19) nor the erase key (23) is pushed, the flow shifts to the state shown in FIG. 18 from the point (B-1). First, whether the execute key (20) has been pushed is checked. When the execute key (20) has been pushed, the preset F is checked. When the preset F=1 holds, necessary work is conducted, whereupon the flow shifts to the check of APF to be stated later. On the other hand, when the preset F=0 holds, IK−@WF is checked. If this IK−@WF=1 holds, F1F is checked. If F1F=0 holds, F1F=0 is established and the check state of APF to be stated later begins, and if F1F=1 holds, F2F is checked. If F2F=0 holds, F2F=1 is established and the state of APF begins, and if F2F=1 holds, the flow shifts to Ⓒ. Further, if the aforecited IK−@WF=0 holds, IK−PF is checked. If IK−PF=0 holds, the flow shifts to Ⓒ, and if IK−PF=1 holds, F2F is checked. If F2F=1 holds, the flow shifts to Ⓒ, and if F2F=0 holds, F1F=1 and F2F=1 are established to begin the check state of APF.

Then, APF is checked. If APF=0 holds, the flow shifts to Ⓒ. If APF=1 holds, the operate F is checked. If it is zero, the flow shifts to Ⓒ, and if it is one, the weighing F is checked. If the weighing F=1 holds and the preset count-up F=1 holds, the flow shifts to Ⓒ. Also when the weighing F=0 holds and F2F=0 holds, the flow shifts to Ⓒ. When the weighing F=0 and F2F=1 hold, $V_1SF$ is checked subject to the preset count-up F=0. If $V_1SF=1$ holds, the $V_1$ timer is started, and if $V_1SF=0$ holds, the $V_1$ timer start is jumped, the conveyor $V_1$ (1), conveyor $V_2$ (2) and conveyor $V_3$ (3) are started, the intermittent timer is made zero, and the flow shifts to Ⓒ.

When the execute key (20) is not pushed, a manual issue key, (not shown), is checked. If it is YES, which is, indicative of the manual issue state, the flow shifts to Ⓒ after the corresponding works have been performed. Unless the state is the manual issue, the operate/stop key (28) is checked. When this key is not pushed, works not illustrated are performed and the flow shifts to Ⓒ, and when it is pushed, APF is checked. If APF=0 holds, the flow shifts to Ⓒ via necessary works, and if APF=1 holds, the operate F is checked. If the operate F=1 holds, the operate F=0 is established, the operate lamp (47) is put out, the conveyors $V_1$ (1), $V_2$ (2) and $V_3$ (3) are stopped, and the flow shifts to Ⓒ. When APF=1 holds and the operate F=0 holds, F2F is checked. If F2F=0 holds, the flow shifts to Ⓒ. If F2F=1 holds, the operate lamp (47) is turned "on", the conveyors $V_1$ (1), $V_2$ (2) and $V_3$ (3) are started, the operate F=1 is established, the intermittent timer is made zero, and the flow shifts to Ⓒ.

In this manner, the key load and the accompanying works which are illustrated in FIGS. 17 and 18 are performed between Ⓑ and Ⓒ in FIG. 16. Operations after Ⓒ are executed as follows. First, whether or not the intermittent timer has timed up is checked. If it has not timed up, it is subjected to +1, and if it has timed up, the conveyors $V_2$ (2) and $V_3$ (3) are stopped. More specifically, the intermittent timer counts the number of times of circulations of the program, it is subjected to +1 each time the program circulates, and its timing of time-up is the number of times of circulations for about 30 seconds. Therefore, the program is not disordered at the time-up, and the timer is reset when the $V_1$ sensor (7) has detected the commodity. Subsequently, $V_1SF$, $V_1TF$, $V_2SF$, $V_3S_1F$ and $V_3S_2F$ are successively checked. If all of these flags are zero, the routine from the check of ACLF to be stated later to the start of the load cell SL (4) are performed. If any one of them stands erect, it is jumped. ACLF is checked, and if ACLF=0 holds, ACLF=1 is established, the ACL counter is made zero and the load cell SL (4) is started, whereas if ACLF=1 holds, the load cell SL (4) is immediately started.

Subsequently, the display data F is made the display data F-2, the print ready F is made the print ready F-2, ACL-2F is made ACL-2F-2, the content of the weight count register-1 (85) is put into the weight count register-3 (86), and the check of APF is executed. If APF=0 holds, the flow shifts to Ⓐ, and if APF=1 holds, whether the display data F-2 is one is checked.

When this display data F-2 stands erect, it is made zero, and the print ready F-2 is checked. If it is zero, ACL-2F-2 is checked. If ACL-2F-2=0 holds, the flow returns to Ⓐ. If ACL-2F-2=1 holds, it is made zero, and the check of $|(WC-3)-(WC-2)| \leq 20$, the check of $|(WC-3)-(ZTR)| \leq 100$ and the check of $K_1 \geq (WC-2) \geq K_2$ are sequentially performed to decide if the zero-point set value is not abnormal. If it is not abnormal, the data of the weight count register-3 (86) are put into the ZT register (84), and the weighing F is checked. If the aforecited print ready F-2=1 holds, the foregoing routine for the auto-zero processing is jumped, and the check state of the weighing F begins. If the weighing F=1 holds, the weight is reckoned from the weight count register-3 (86), the operation of $@ \times W = P$ is executed and the result is displayed, to reach a point Ⓓ. From the point Ⓓ, the check of the print ready F-2 is performed again. If the print ready F-2 is zero, the flow returns to Ⓐ, and if it is one, the print command F is erected and the print ready F-2 is made zero to reach a point Ⓔ.

Referring back to the previous step, if the display data F-2=0 holds, the print command F is checked. If the print command F=1 holds, the flow shifts to the point Ⓔ, and if the print command F=0 holds, the weighing F is checked. When the weighing F=1 holds, the flow returns to Ⓐ, and when the weighing F=0 holds, the print ready F-2 is checked, whereupon the flow returns to Ⓐ at the print ready F-2=0 and returns to Ⓓ at the print ready F-2=1.

From the point Ⓔ, $V_3S_1F$ is checked. If $V_3S_1F=0$ holds, the flow returns to Ⓐ, and if $V_3S_1F=1$ holds, the print command F is made zero and the two-stage print F is checked. When the two-stage print F=0 holds, that is, the print is of one stage, the print is executed and then the label feed is executed. On the other hand, in case where the two-stage print F=1 holds, that is, the print is of two stages, the $V_1$ start timer is started, the print of the first stage is executed and a subfeed corresponding to the interval of print rows is executed, and further, the print of the second stage is executed, INT $V_3S$ is reset and the label feed is executed. Subsequently, the two-stage print F is checked again. When the two-stage print F=0 holds, $V_3S_2F=1$ is established, $V_3S_1F=0$ is established, INT $V_3S$ is reset and the flow returns to Ⓐ. On the other hand, when the two-stage print F=1 holds, $V_3S_2F$ is checked. If $V_3S_2F=0$ holds, it is made one, $V_3S_1F=0$ is established and the flow returns to Ⓐ. If $V_3S_2F=1$ holds, the label blowing (STICK) is made, $V_3S_2F=0$ is established, the conveyor $V_3$ (3) is started and the flow returns to Ⓐ.

Obviously, many modifications and variations of the present invention are possible in light of the above teachings. It is therefore to be understood that within the scope of the appended claims, the invention may be practiced otherwise than as specifically described herein.

We claim:

1. A conveyor control apparatus in a fully-automatic labeling system comprising:
   a sending-in conveyor, a weighing conveyor and a sticking conveyor which have their operations controlled independently of one another and which are disposed in alignment with one another,
   sensors which are disposed in proximity to the respective conveyors and which detect the existence of a commodity,
   short-time timers which control outputs from these sensors,
   an intermittent timer which controls the operations of said weighing conveyor and said sticking conveyor, depending upon whether or not the sensor of said sending-in conveyor has detected the commodity within a predetermined time, a load cell, said weighing conveyor being a load of said load cell, a printer which prints data based on a signal from said load cell or preset data on a label, and a sticking machine which sticks the printed label to the commodity on said sticking conveyor.

2. The conveyor control apparatus in a fully-automatic labeling system as set forth in claim 1, wherein when the commodity has been detected by said sensor disposed in proximity to said sending-in conveyor, the predetermined time is set by said intermittent timer upon the detection, and when said sensor does not execute a new commodity detection in said predetermined time, said weighing conveyor and said sticking conveyor are stopped, while when it executes the new commodity detection in said predetermined time, the operations of said weighing conveyor and said sticking conveyor are continued.

3. The conveyor control apparatus in a fully-automatic labeling system as set forth in claim 1, wherein said sending-in conveyor is stopped upon the commodity detection by said sensor of said sending-in conveyor, and said sending-in conveyor is started by a combination of the short-time timer and the output of said load cell which starts upon the detection of the already-fed commodity by said sensor of said weighing conveyor, whereby the automatic weighing of the commodity is performed under a condition in which a period of time, during which no commodity exists on said weighing conveyor, is shortened.

4. The conveyor control apparatus in a fully-automatic labeling system as set forth in claim 1, wherein, in a print fixing operation in which a print content is fixed, said sending-in conveyor is stopped upon the commodity detection of said sensor of said sending-in conveyor and is started by a combination of the short-time timer and the output of said load cell which starts upon the detection of the already-fed commodity by said sensor of said weighing conveyor, thereby to match timings of a commodity transportation interval and a label issue interval.

5. The conveyor control apparatus in a fully-automatic labeling system as set forth in claim 1, wherein, when the print for the label is of one stage, a transportation speed of said sticking conveyor is set so that the commodity may reach a label sticking position after a fixed time, preset as is necessary from the detection of the commodity by said sensor of said sticking conveyor.

6. The conveyor control apparatus in a fully-automatic labeling system as set forth in claim 1, wherein, when the print for the label is of two stages, said sticking conveyor is temporarily stopped from the detection of the commodity by said sensor of said sticking conveyor to completion for preparation for the label sticking, thereby to permit print time to be long.

7. The conveyor control apparatus in a fully-automatic labeling system as set forth in claim 1 or 6, wherein, when the print for the label is of two stages, a start timing of said sending-in conveyor is delayed with respect to a start timing in a one-stage print mode.

8. The conveyor control apparatus in a fully-automatic labeling system as set forth in claim 1, wherein said load cell continues to operate even when no commodity is flowing.

* * * * *